United States Patent
Schmitz et al.

(10) Patent No.: US 6,958,083 B1
(45) Date of Patent: Oct. 25, 2005

(54) AIR CLEANER WITH REDUCED RESTRICTION PRECLEANER

(75) Inventors: Kelly R. Schmitz, Rockton, IL (US); Jeffrey A. Rech, Verona, WI (US)

(73) Assignee: Fleetguard, Inc., Nashville, TN (US)

( * ) Notice: Subject to any disclaimer, the term of this patent is extended or adjusted under 35 U.S.C. 154(b) by 8 days.

(21) Appl. No.: 10/758,068

(22) Filed: Jan. 15, 2004

(51) Int. Cl.[7] .............................................. B01D 46/24
(52) U.S. Cl. .................. 55/337; 55/457; 55/459.1; 55/498; 55/504
(58) Field of Search .................... 55/337, 320, 399, 55/418, 456, 457, 459.1, 498, 504

(56) References Cited

U.S. PATENT DOCUMENTS

| | | | |
|---|---|---|---|
| 3,928,007 A | * | 12/1975 | Jackson ........................ 55/337 |
| 4,950,317 A | * | 8/1990 | Dottermans .................. 55/337 |
| 5,547,480 A | | 8/1996 | Coulonvaux |
| 5,730,769 A | | 3/1998 | Dungs et al. |
| 5,755,842 A | | 5/1998 | Patel et al. |
| 6,039,778 A | | 3/2000 | Coulonvaux |
| 6,051,042 A | | 4/2000 | Coulonvaux |
| 6,402,798 B1 | | 6/2002 | Kallsen et al. |

* cited by examiner

Primary Examiner—Frank M. Lawrence
(74) Attorney, Agent, or Firm—Andrus, Sceales, Starke & Sawall, LLP (57) ABSTRACT

An air cleaner is provided with a reduced restriction precleaner cooperating with a tangential inlet and centering and locating an annular filter element, and reducing inlet restriction.

11 Claims, 8 Drawing Sheets

AIR CLEANER WITH REDUCED RESTRICTION PRECLEANER

BACKGROUND AND SUMMARY

The invention relates to air cleaners, and more particularly to air cleaners having a tangential inlet and a precleaner.

Air cleaners with a tangential inlet and a precleaner are known in the prior art. Such air cleaners typically have a cylindrical housing and provide two stage cleaning, namely a precleaner provided by flow from the tangential inlet along a spiral path, and a second stage provided by radial inward flow through an annular filter element. The precleaner is typically provided by an annular sleeve circumscribing the annular filter element and spaced radially inwardly of the interior surface of the cylindrical sidewall of the housing by a radial gap defining an annular flow channel between the sleeve and the interior surface of the cylindrical housing sidewall. A ramp in the channel may direct air flow along a helical pattern. The sleeve also helps to locate and center the annular filter element within the housing. While the sleeve provides the noted desirable functions, it also contributes to restriction of the air flow as it enters the housing, which restriction is undesirable.

The present invention addresses the noted restriction disadvantage, and provides a sleeve which desirably facilitates the noted helical air flow pattern for precleaning and also facilitates location and centering of the annular filter element within the housing, and which reduces entry restriction to air flow suffered by prior sleeves.

BRIEF DESCRIPTION OF THE DRAWING

Prior Art

Present Invention

DETAILED DESCRIPTION

Prior Art

Figure 1:
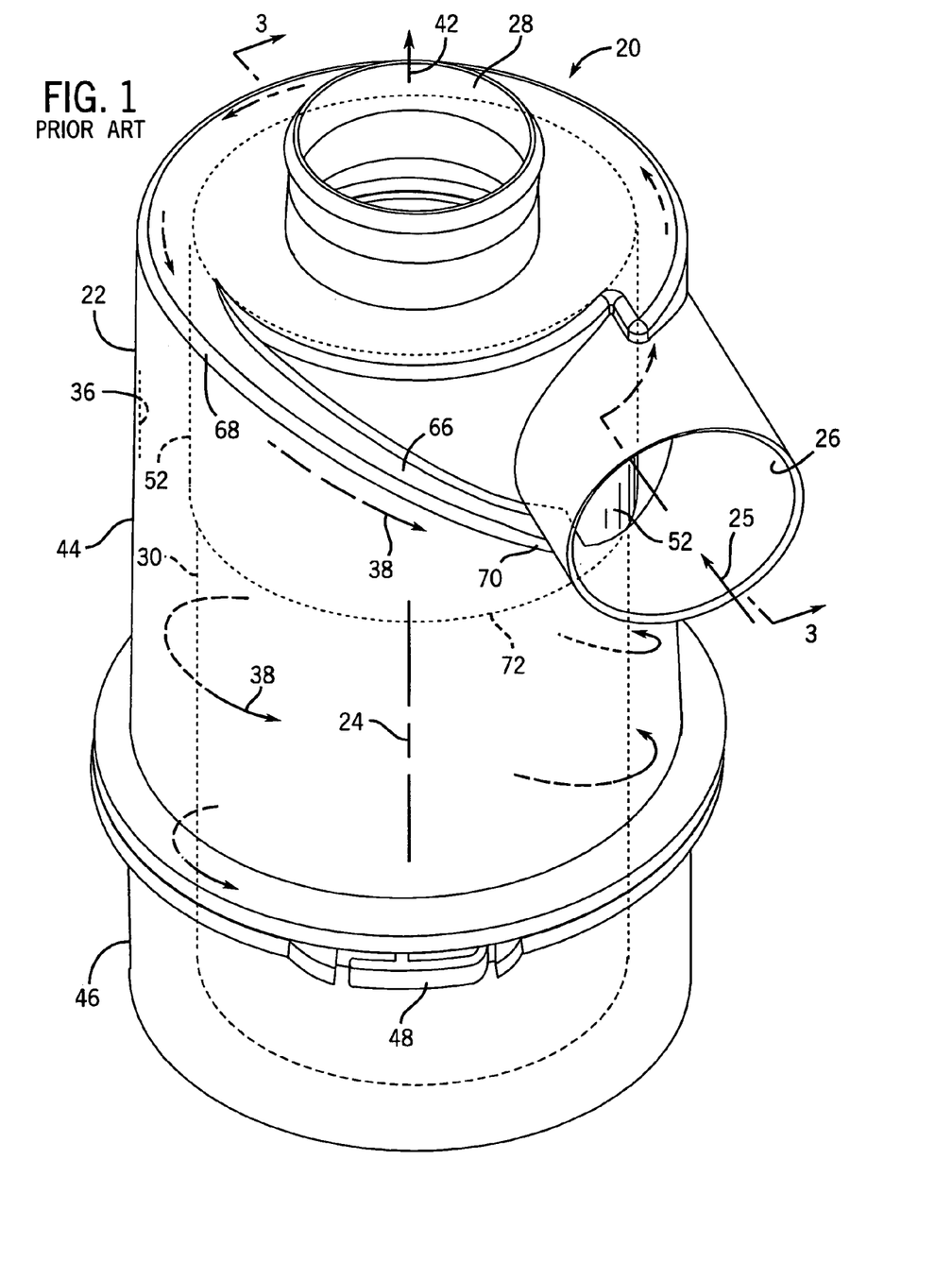
FIG. 1 is an isometric view of an air cleaner known in the prior art.
Figure 2:
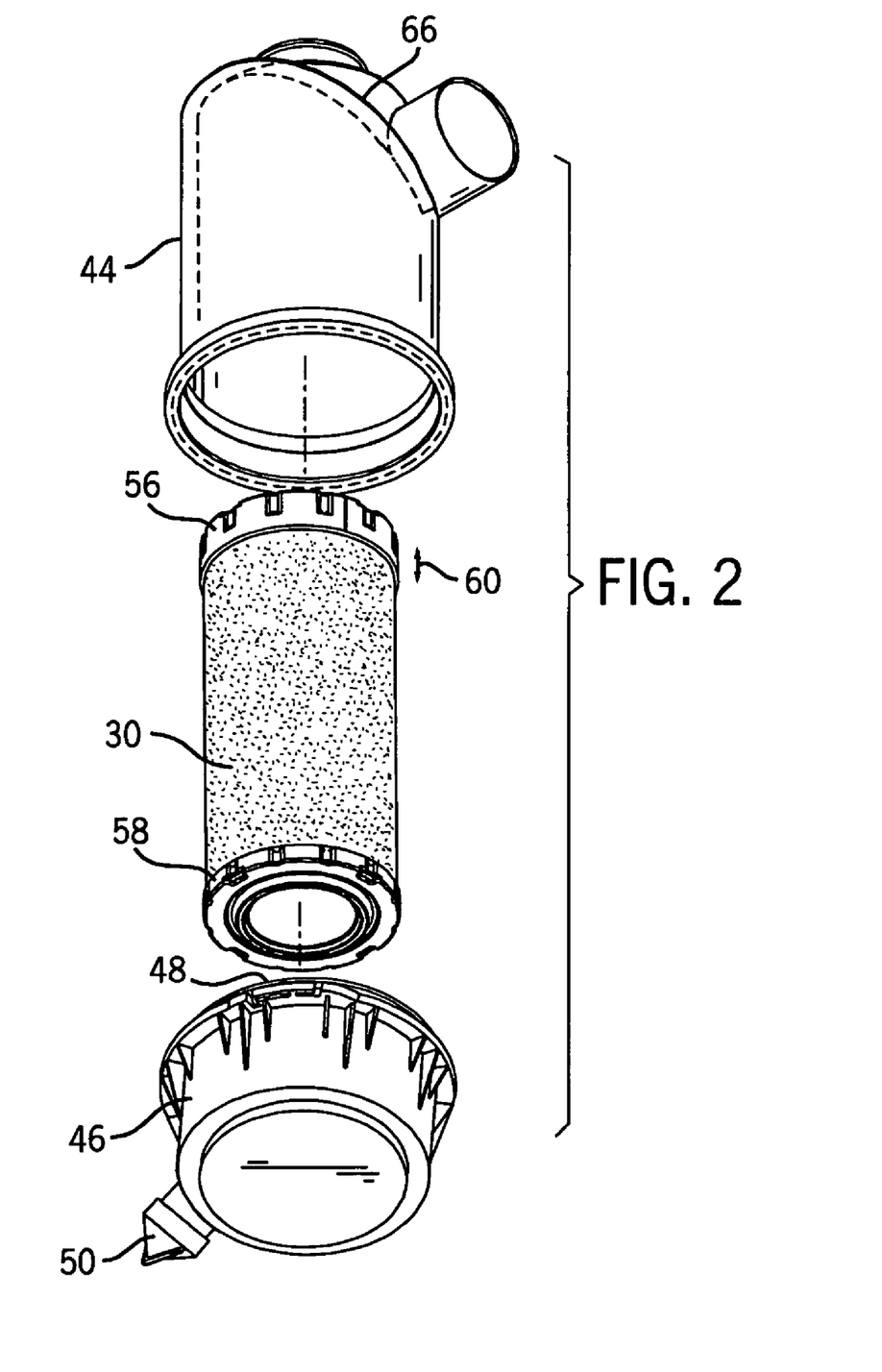
FIG. 2 is an exploded perspective view of the air cleaner of FIG. 1.
Figure 3:
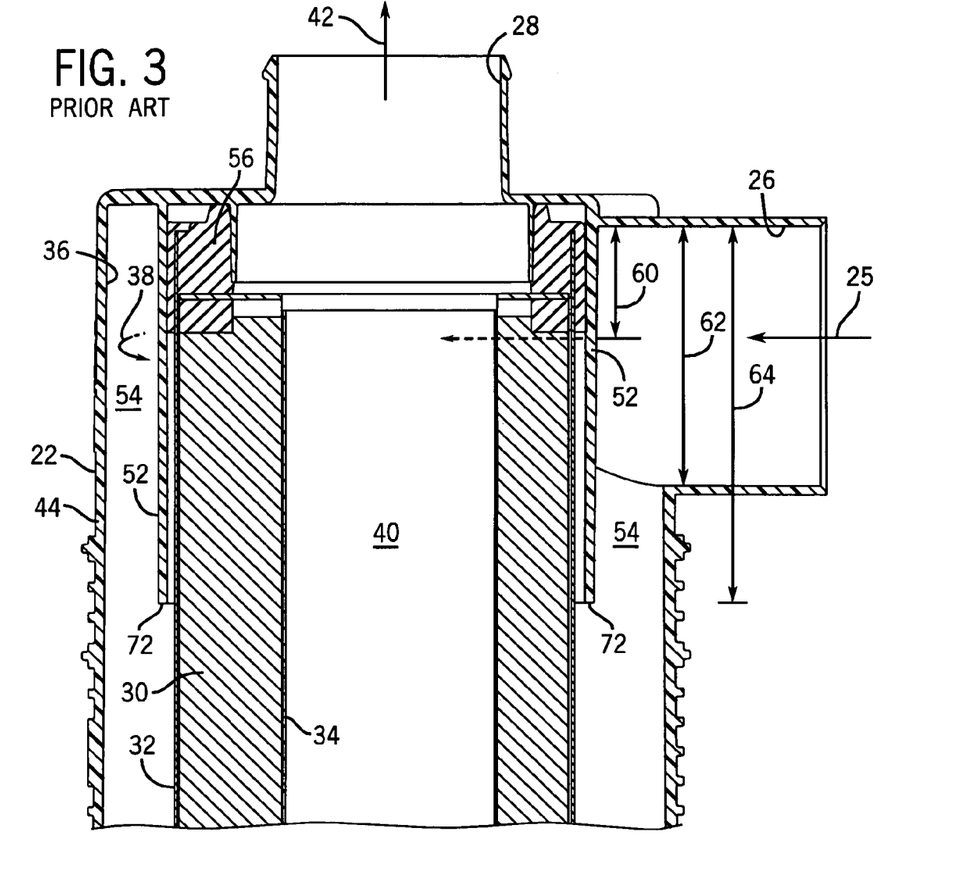
FIG. 3 is a sectional view taken along line 3—3 of FIG. 1.

FIG. 1 shows an air cleaner 20 including a cylindrical housing 22 extending axially along an axis 24 and having a tangential inlet 26 and having an outlet 28. An annular filter element 30, FIGS. 2, 3, in housing 22 has a dirty side 32 receiving dirty air from inlet 26 and having a clean side 34 delivering clean filtered air to outlet 28. Air entering housing 22 through tangential inlet 26 as shown at arrow 25 flows along an interior surface 36 of housing 22 in a helical spiral pattern 38 about axis 24, and flows radially inwardly through annular filter element 30 into the latter's hollow interior 40 and then flows axially through outlet 28 as shown at arrow 42. Housing 22 is typically a two-piece plastic assembly provided by upper housing section 44 and lower housing section 46 joined by a twist and lock structure 48, for example as shown in U.S. Pat. No. 6,402,798, incorporated herein by reference. Lower housing section 46 may have a purge valve 50 for periodically discharging collected particulate due to the precleaning provided by the centrifugal separation afforded by helical pattern 38, as is known.

An annular shielding sleeve 52 is integrally formed as part of the upper housing section 44 and circumscribes annular filter element 30 and is spaced radially inwardly of interior surface 36 of the sidewall of the housing by a radial gap 54 defining an annular flow channel between sleeve 52 and interior surface 36 of the sidewall of the housing. Filter element 30 has upper and lower axial ends covered by respective upper and lower axial end caps 56 and 58, FIG. 2, which end caps may form axial and/or radial seals with respective upper and lower housing sections 44 and 46, all as is known. Upper end cap 56 is at tangential inlet 26 and has an axial height 60, FIGS. 2, 3. Tangential inlet 26 has an axial height 62 greater than axial height 60 of end cap 56. Sleeve 52 has an axial height 64 greater than axial height 62 of tangential inlet 26.

Figure 4:
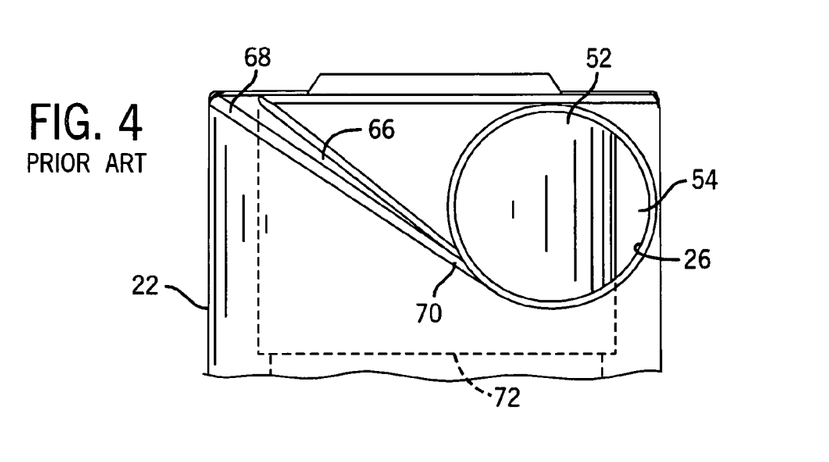
FIG. 4 is an elevation view of the inlet of the air cleaner of FIGS. 1–3.
Figure 5:
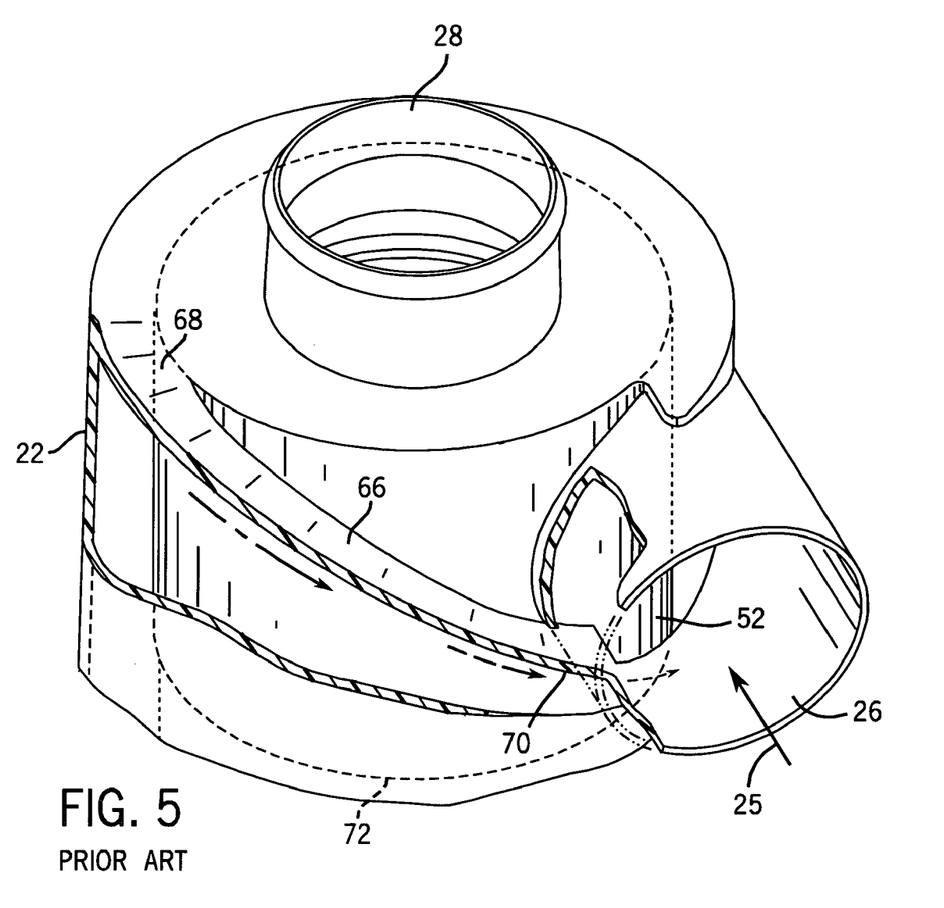
FIG. 5 is a perspective view partially cutaway of a portion of the air cleaner of FIG. 1.

Housing 22 at upper section 44 has a ramp 66 in channel 54 directing air flow along the noted helical pattern 38. Ramp 66 has a leading end 68 and has a trailing end 70. The ramp has a minimum axial height at leading end 68, and has a maximum axial height at trailing end 70. The axial height 64 of sleeve 52 is greater than the maximum axial height of ramp 66 at trailing end 70. The lower axial end 72 of sleeve 52 is viewable in FIG. 3, and is shown in dashed line in FIGS. 1, 4, 5.

Present Invention

FIGS. 6–12 illustrate the present invention and use like reference numerals from above where appropriate to facilitate understanding.

Figure 6:
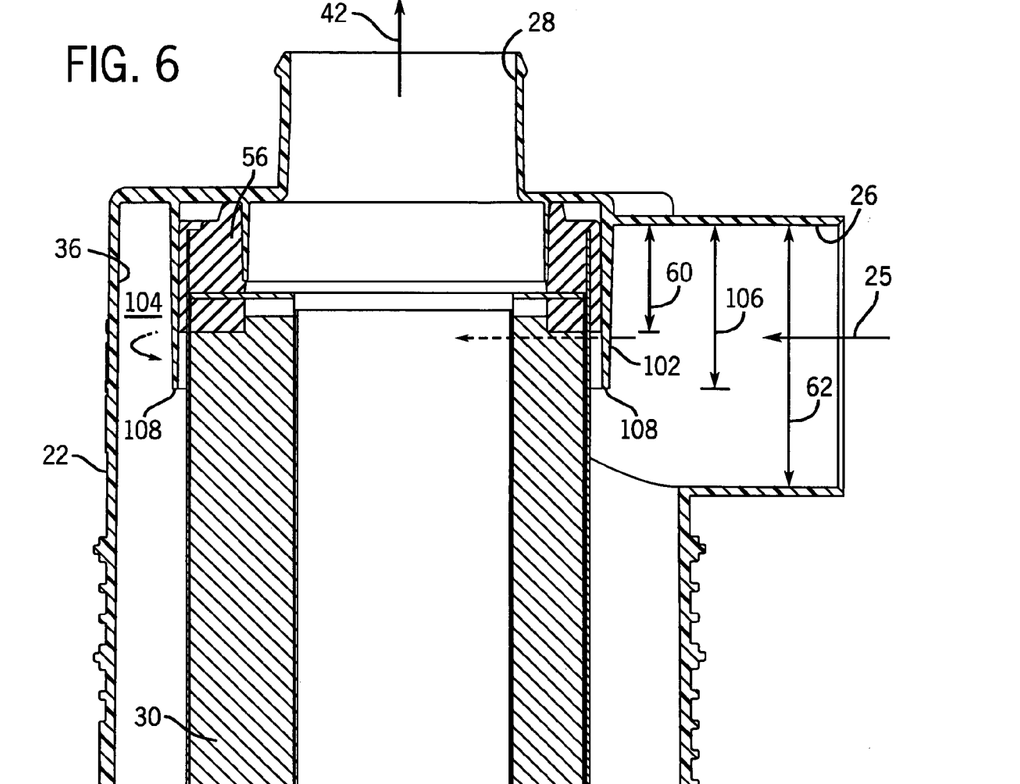
FIG. 6 is a view like FIG. 3 and shows an embodiment of the present invention.
Figure 7:
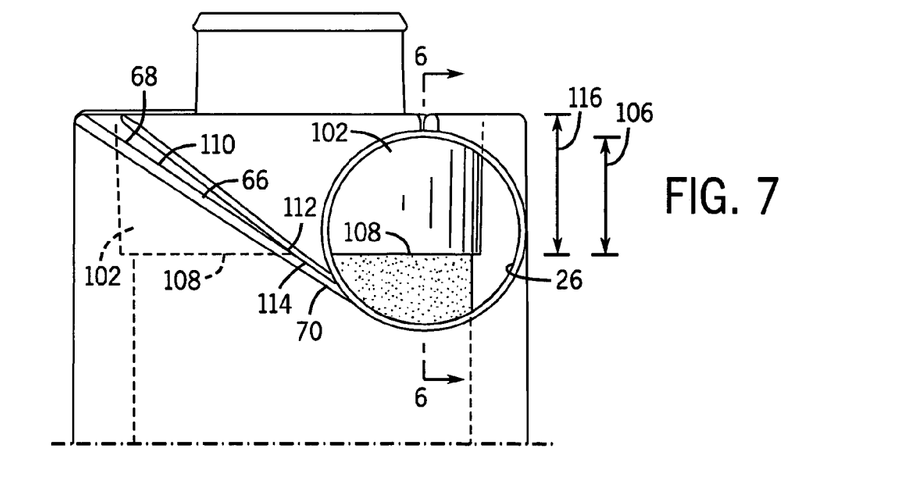
FIG. 7 is a view like FIG. 4 and shows the embodiment of the present invention illustrated in FIG. 6.

In FIG. 6, annular shielding sleeve 102 circumscribes annular filter element 30 and is spaced radially inwardly of interior surface 36 of the cylindrical sidewall of housing 22 by a radial gap 104 defining an annular flow channel between sleeve 102 and interior surface 36 of the sidewall of the housing. Sleeve 102 has an axial height 106 greater than or equal to axial height 60 of end cap 56 and less than axial height 62 of tangential inlet 26. This reduces the restriction to incoming air flow through tangential inlet 26 at arrow 25.

Figure 8:
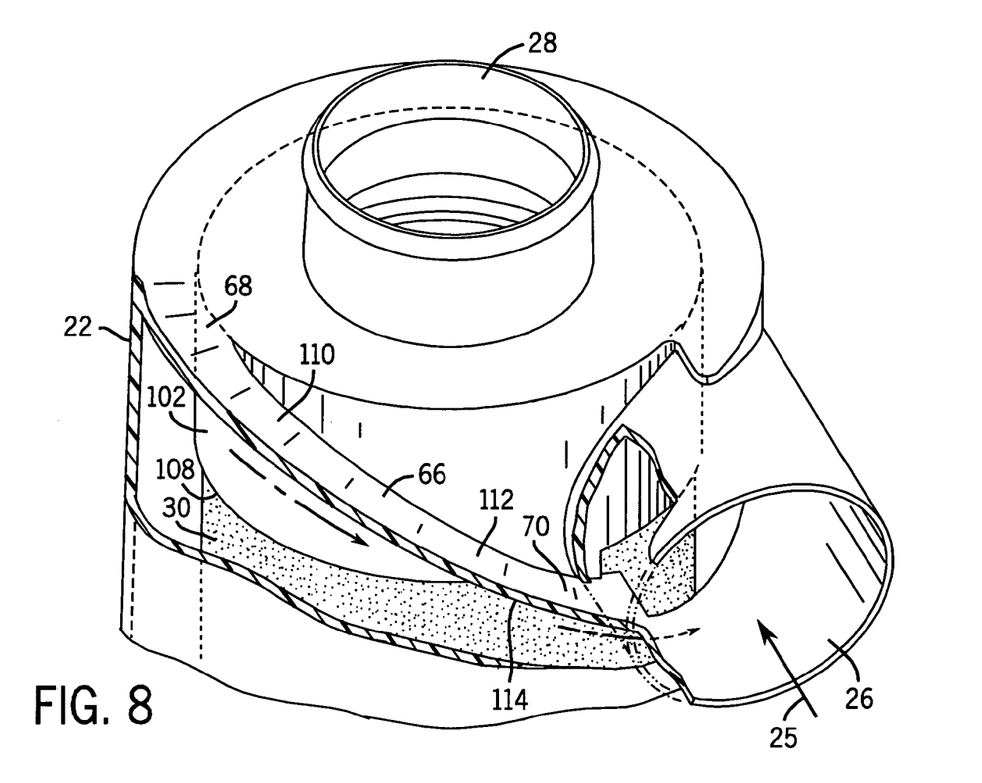
FIG. 8 is a view like FIG. 5 and shows the embodiment of the present invention illustrated in FIGS. 6 and 7.

Axial height 106 of sleeve 102 is less than the maximum axial height of ramp 66 at trailing end 70. The lower axial end 108 of sleeve 102 is shown in FIGS. 6 and 8, and is shown at solid line in the right portion of FIG. 7 and dashed line in the left portion of FIG. 7. Ramp 66 has a first segment 110 extending circumferentially and axially along sleeve 102 from leading end 68 of the ramp to an intermediate portion 112 of the ramp. Ramp 66 has a second segment 114 extending circumferentially and axially beyond sleeve 102 at lower edge 108 from intermediate portion 112 of the ramp to trailing end 70 of the ramp. Intermediate portion 112 of ramp 66 has an axial height 116, FIG. 7, equal to axial height 106 of sleeve 102. The entire circumferential length of second segment 114 of ramp 66 from intermediate portion 112 to trailing end 70 has an axial height greater than axial height 106 of sleeve 102.

FIGS. 9–12 show a further and preferred embodiment of the present invention and use like reference numerals from above where appropriate to facilitate understanding. In FIGS. 9–12, sleeve 102 is replaced by a sleeve 132 having an axial height tapered at 134 along a portion of its circumference at a location aligned with tangential inlet 26, such that incoming air at 25 through tangential inlet 26 does not initially encounter a full axial height sleeve, as at 52 in FIGS. 1–5, and preferably not even a partial axial height sleeve as at 102 in FIGS. 6–8, but instead encounters a tapered sleeve of increasing axial height from lowest axial height at 136 to highest axial height at 138, whereby to reduce initial flow restriction at air inflow 25.

Tapered portion 134 of sleeve 132 has a leading end at 136 and a trailing end at 138. Annular flow channel 140 formed by the radial gap between annular filter element 30 and interior surface 36 of the cylindrical sidewall of the housing has a first circumferential section 142 of increasing axial depth to air flow therealong from leading end 136 of tapered portion 134 of sleeve 132 to trailing end 138 of tapered portion 134 of sleeve 132. The channel has a second circumferential section 144 directing air flow therealong from trailing end 138 of tapered portion 134 of sleeve 132. Ramp 66 in channel 140 directs air flow along helical pattern 146. Circumferential section 144 of channel 140 directs air flow therealong from trailing end 138 of tapered portion 134 of sleeve 132 to leading end 68 of ramp 66. Channel 140 has a third circumferential section 148 directing air flow therealong from leading end 68 of ramp 66. Third circumferential section 148 of channel 140 has a decreasing axial depth to air flow therealong. Air flow entering tangential inlet 26 encounters increasing axial channel depth along first circumferential section 142 of channel 140 and then is directed through second circumferential section 144 of channel 140 and then encounters decreasing axial channel depth along third circumferential section 148 of channel 140.

Figure 9:
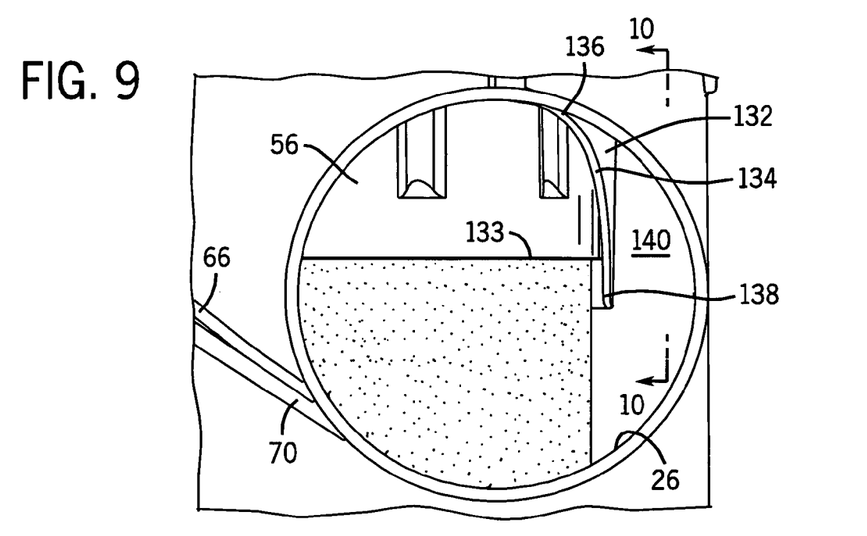
FIG. 9 is a view like FIG. 7 and shows another embodiment of the present invention.
Figure 10:
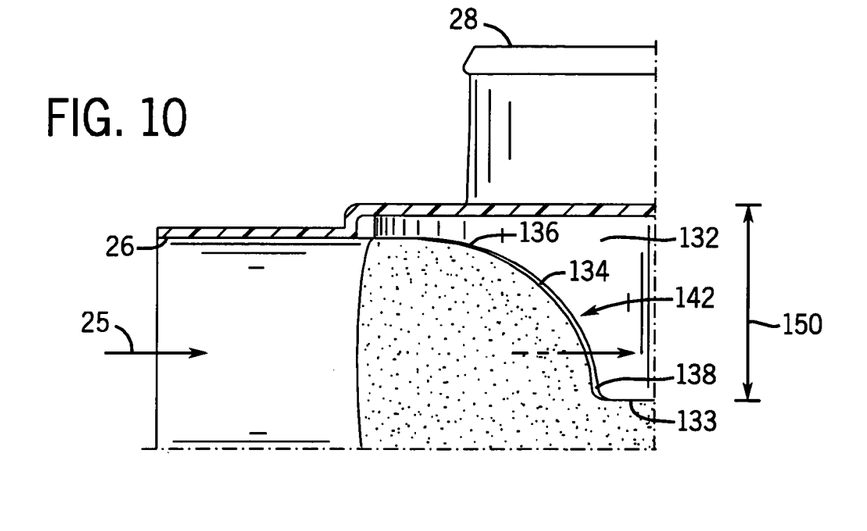
FIG. 10 is a sectional view taken along line 10—10 of FIG. 9.
Figure 11:
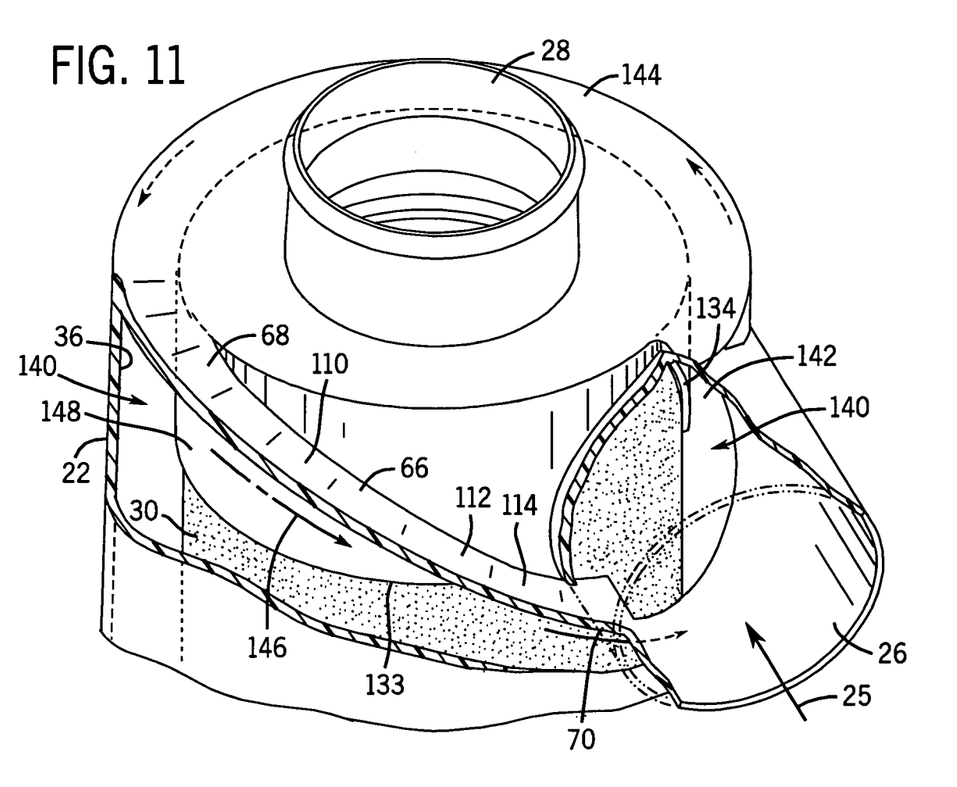
FIG. 11 is a view like FIG. 8 and shows the embodiment of the present invention illustrated in FIGS. 9 and 10.
Figure 12:
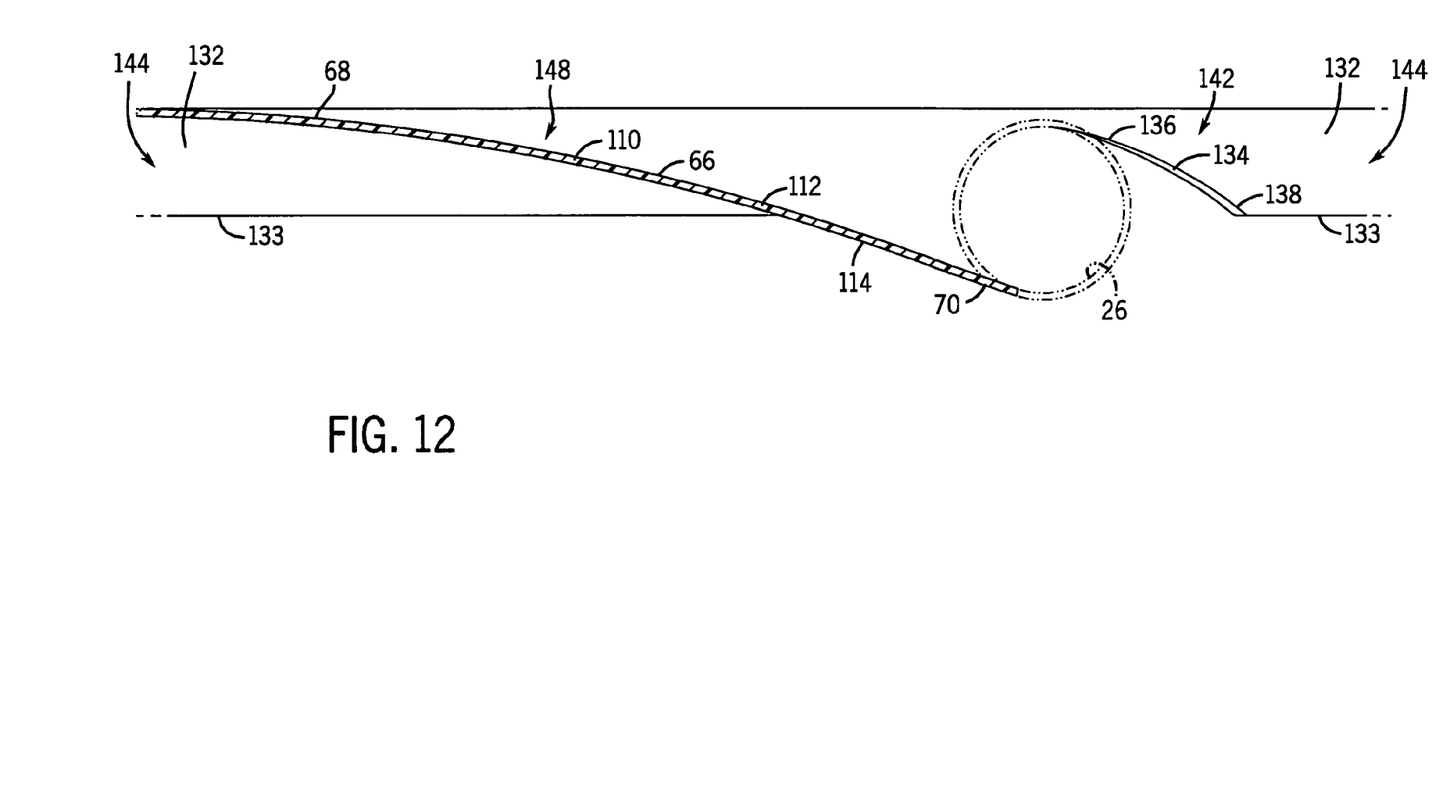
FIG. 12 is a view of the cylindrical sleeve and air flow channel of the embodiment of FIGS. 9–11 unrolled and laid out in a flat profile view.

Tangential inlet 26 is axially between leading end 136 of tapered portion 134 of sleeve 132 and trailing end 70 of ramp 66 such that leading end 136 of tapered portion 134 of sleeve 132 and trailing end 70 of ramp 66 are on axially distally opposite sides of tangential inlet 26. Trailing end 138 of tapered portion 134 of sleeve 132 and leading end 68 of ramp 66 are on circumferentially distally opposite sides of tangential inlet 26. Axial height 150, FIG. 10, of sleeve 132 at trailing end 138 of tapered portion 134 of the sleeve, which in the preferred embodiment is the same as axial height 106 of sleeve 102, FIG. 6, is less than the axial height of ramp 66 at trailing end 70. Ramp 66 has the noted first segment 110 extending circumferentially axially along sleeve 132 from leading end 68 of the ramp to intermediate portion 112 of the ramp, and the ramp has the noted second segment 114 extending circumferentially and axially beyond sleeve 132 at lower end 133 from intermediate portion 112 of the ramp to trailing end 70 of the ramp. The axial height of sleeve 132 at trailing end 138 of tapered portion 134 of the sleeve is less than the axial height 62 of tangential inlet 26.

It is recognized that various equivalents, alternatives and modifications are possible within the scope of the appended claims.

What is claimed is:

1. An air cleaner comprising a cylindrical housing extending axially along an axis and having a tangential inlet and having an outlet, an annular filter element in said housing and having a dirty side receiving dirty air from said tangential inlet and having a clean side delivering clean filtered air to said outlet, such that air entering said housing through said tangential inlet flows along an interior surface of a sidewall of said housing in a helical pattern about said axis, and flows radially inwardly through said annular filter element, an annular shielding sleeve circumscribing said annular filter element and spaced radially inwardly of said interior surface of said sidewall of said housing by a radial gap defining an annular flow channel between said sleeve and said interior surface of said sidewall of said housing, said filter element having an axial end covered by an axial end cap at said tangential inlet, said end cap having an axial height, said tangential inlet having an axial height greater than said axial height of said end cap, said sleeve having an axial height greater than or equal to said axial height of said end cap and less than said axial height of said tangential inlet.

2. The air cleaner according to claim 1 wherein said housing has a ramp in said channel directing air flow along said helical pattern, said ramp having a leading end and a trailing end, said ramp having a minimum axial height at said leading end, said ramp having a maximum axial height at said trailing end, wherein said axial height of said sleeve is less than said maximum axial height of said ramp.

3. The air cleaner according to claim 2 wherein said ramp has a first segment extending circumferentially and axially along said sleeve from said leading end of said ramp to an intermediate portion of said ramp, and said ramp has a second segment extending circumferentially and axially beyond said sleeve from said intermediate portion of said ramp to said trailing end of said ramp, wherein said intermediate portion of said ramp has an axial height equal to said axial height of said sleeve, and wherein the entire circumferential length of said second segment of said ramp from said intermediate portion of said ramp to said trailing end of said ramp has an axial height greater than said axial height of said sleeve.

4. An air cleaner comprising a cylindrical housing extending axially along an axis and having a tangential inlet and having an outlet, an annular filter element in said housing and having a dirty side receiving dirty air from said tangential inlet and having a clean side delivering clean filtered air to said outlet, such that air entering said housing through said tangential inlet flows along an interior surface of a sidewall of said housing in a helical pattern about said axis, and flows radially inwardly through said annular filter element, an annular shielding sleeve circumscribing said annular filter element and spaced radially inwardly of said interior surface of said sidewall of said housing by a radial gap defining an annular flow channel between said sleeve and said interior surface of said sidewall of said housing, said sleeve having an axial height tapered along a portion of its circumference at a location aligned with said tangential inlet, such that incoming air through said tangential inlet does not initially encounter a full axial height sleeve, but instead encounters a tapered sleeve of increasing axial height, whereby to reduce initial flow restriction.

5. The air cleaner according to claim 4 wherein said tapered portion of said sleeve has a leading end and a trailing end, said channel has a first circumferential section of increasing axial depth to air flow therealong from said leading end of said tapered portion of said sleeve to said trailing end of said tapered portion of said sleeve, and said channel has a second circumferential section directing air flow therealong from said trailing end of said tapered portion of said sleeve.

6. The air cleaner according to claim 5 wherein said housing has a ramp in said channel directing air flow along said helical pattern, said ramp having a leading end and a trailing end, said ramp having a minimum axial height at said leading end of said ramp, said ramp having a maximum axial height at said trailing end of said ramp, wherein said second circumferential section of said channel directs air flow therealong from said trailing end of said tapered portion of said sleeve to said leading end of said ramp, and wherein said channel has a third circumferential section directing air flow therealong from said leading end of said ramp, said third circumferential section of said channel having decreasing axial depth to air flow therealong, such that air flow entering said tangential inlet encounters increasing axial channel depth along said first circumferential section of said channel and then is directed through said second circumferential section of said channel and then encounters decreasing axial channel depth along said third circumferential section of said channel.

7. The air cleaner according to claim 6 wherein said tangential inlet is axially between said leading end of said tapered portion of said sleeve and said trailing end of said ramp such that said leading end of said tapered portion of said sleeve and said trailing end of said ramp are on axially distally opposite sides of said tangential inlet.

8. The air cleaner according to claim 7 wherein said trailing end of said tapered portion of said sleeve and said leading end of said ramp are on circumferentially distally opposite sides of said tangential inlet.

9. The air cleaner according to claim 6 wherein the axial height of said sleeve at said trailing end of said tapered portion of said sleeve is less than the axial height of said ramp at said trailing end of said ramp.

10. The air cleaner according to claim 9 wherein said ramp has a first segment extending circumferentially and axially along said sleeve from said leading end of said ramp to an intermediate portion of said ramp, and said ramp has a second segment extending circumferentially and axially beyond said sleeve from said intermediate portion of said ramp to said trailing end of said ramp.

11. The air cleaner according to claim 5 wherein the axial height of said sleeve at said trailing end of said tapered portion of said sleeve is less than the axial height of said tangential inlet.

* * * * *